United States Patent [19]

Häberli et al.

[11] 4,295,850

[45] Oct. 20, 1981

[54] COMMERCIAL PREPARATIONS OF DRY ORGANIC SUBSTANCES

[75] Inventors: Roland Häberli, Würenlingen; Hans Mollet, Reinach; Gustaaf Scherer, Basel, all of Switzerland

[73] Assignee: Ciba-Geigy Corporation, Ardsley, N.Y.

[21] Appl. No.: 152,951

[22] Filed: May 23, 1980

Related U.S. Application Data

[63] Continuation of Ser. No. 14,194, Feb. 22, 1978, abandoned, which is a continuation of Ser. No. 846,041, Oct. 27, 1977, abandoned, which is a continuation of Ser. No. 713,556, Aug. 11, 1976, abandoned, which is a continuation of Ser. No. 521,309, Nov. 6, 1974, abandoned.

[30] Foreign Application Priority Data

Nov. 13, 1973 [CH] Switzerland ............... 15962/73

[51] Int. Cl.³ ............................................. D06P 67/02
[52] U.S. Cl. ........................................ 8/524; 8/543; 8/552; 8/654; 252/90; 252/301.21
[58] Field of Search ............... 8/524, 552; 252/90, 252/301.21

[56] References Cited

U.S. PATENT DOCUMENTS 4,046,507  9/1977  Zweifel et al. ................. 8/526

OTHER PUBLICATIONS

Hill, F. N. et al., Industrial and Engineering Chemistry, 1958, 50, (No. 1), pp. 5–16.
Modern Packaging Encyclopedia, Section 4 (Plastics, Films, Foils), 1971, pp. 138–139.

Primary Examiner—A. Lionel Clingman
Attorney, Agent, or Firm—John P. Spitals; Edward McC. Roberts

[57] ABSTRACT

Stable dust-free commercial preparations of organic substances are described, which preparations comprise an organic substance especially a dyestuff or optical brightener in dry powder form enclosed in a covering, particularly in a sack or bag sealed on all sides, made from polyethylene oxide having a molecular weight of more than 200,000 and a thickness of 10 to 80μ, which covering is soluble in the same medium as the content.

6 Claims, No Drawings

COMMERCIAL PREPARATIONS OF DRY ORGANIC SUBSTANCES

This is a cont. of application Ser. No. 014,194 filed on Feb. 22, 1979; which in turn is a cont. of Ser. No. 846,041 filed Oct. 27, 1977, now abandoned; which in turn is a cont. of Ser. No. 713,556 filed Aug. 11, 1976, now abandoned; which in turn is a cont. of Ser. No. 521,309 filed Nov. 6, 1974, now abandoned.

The invention relates to a commercial preparatin of dry organic substances, to processes for the manufacture of this commercial preparation and to the use thereof.

It has become the general practice to pack the most varied materials—both solid and liquid—in plastics sheet. These packages have many advantages, including the attractive appearance of the materials packed in this manner, and the predosing of the contents of the packages so that on application of the contents of the packages sufficient product is available for the effective carrying out of the required task, and the lessening of the inconveniences that are associated with the use of loose materials which give off dust, or which are in some other way undersirable, when the user applies them—contamination of the environment, irritation of the mucous membrane resulting from dust particles, etc.

These employed packages made from plastics sheet, paper (cardboard) or metal have hitherto not been soluble in the normally applied solvents, so that the removal of the packing material before use of the contents in solvents such as water or organic media was unavoidable.

The Belgian Pat. No. 762,561 describes for a commercial preparation of, in particular, water-soluble reactive dyestuffs or optical brighteners, inter alia, polyvinyl alcohol packages, which packages dissolve in water. These sheets have however the disadvantage that they are soluble only in water, and preferably in cold water, but not in organic solvents.

It has now been found that sheets made from polyethylene oxide are soluble in cold water and also in warm water and, moreover, in organic solvents. They are therefore excellently suitable for the packing of dry organic substances; so that there is thus provided a universal commercial preparation of these substances in that the packing material is soluble in the same solvent as that in which the contents enclosed by the said packing material are soluble.

The use of such packages is an added convenience and safeguard for the consumer, e.g. in the case of dyestuffs for the dyer, who simply throws the package, depending on the solubility of the dyestuffs, into the aqueous or organic liquor, without any necessity for the opening and removal of the packing material. In particular, this form of packaging renders possible a hitherto unattainable improvement of factory hygiene.

The subject of the invention is hence commercial forms or preparations of dry organic substances, such as, e.g. of dyestuffs, such as water-soluble, acid or cation-active or organosoluble dyestuffs, especially water-soluble reactive dyestuffs, of pigments, especially those of an organic nature, of optical brighteners and chemicals, such as dyeing auxiliaries, for example, tanning and bleaching agents, which substances are enclosed by a covering, particularly by a polyethylene oxide bag or sack sealed on all sides, and which substances can be soluble both in water and in organic solvents.

The polyethylene oxide sheets to be used according to the invention as packing material are polymerisation products of ethylene oxide having a molecular weight of more than 200,000, and the sheets have a thickness of about 10 to 80$\mu$, especially 50$\mu$. These sheets are readily soluble in cold water and also in warm water, as well as in organic solvents, whereby the rate of dissolving is dependent on the dissolving medium and on the temperature. Thus, for example, such a sheet dissolves in water at 80° C. within about 20 seconds, whereas in tetrachloroethylene at 70° C. it is dissolved within about 75 seconds.

Organicsolvents in which this polyethylene oxide sheet as defined in soluble are, to mention just a few, e.g.: nitriles such as acetonitrile; halogenated aliphatic hydrocarbons such as ethylene dichloride, carbon tetrachloride, trichloroethylene, tetrachloroethylene and methylene dichloride; hydrocarbons such as benzene, toluene, xylene and anisole; mono- or polyvalent alcohols such as ethyl alcohol, methyl alcohol, isopropyl alcohol, butyl alcohol, 1,3-butanediol, ethylene glycol, diethylene glycol and glycerin; amides such as dimethylformamide; ethers such as tetrahydrofuran; diesters of carbonic acid such as ethylene carbonate; ketones such as methyl ethyl ketone, acetone, 1,4-dioxane and methylisobutyl ketone; acetates such as glycol monoethyl ether acetate, cellosolve acetate, ethyl acetate and butyl acetate, as well as amines cuh as ethylenediamine.

The polyethylene oxide sheet or covering as defined has the advantage that, even with very high amounts of moisture in the air, it absorbs very little moisture, which means that the contained substance is very well protected against moisture; the consequence of this is that, in the case of long storage periods, a second package protecting the first one can be dispensed with. Furthermore, the said sheet has a very good resistance to cold, is extremely flexible, does not therefore tear when heavily loaded, and, finally, indirectly renders the contents free from dust. Clear solutions are obtained on dissolving of the packages in water or in organic solvents.

Suitable contents of the packages are, in particular, practically all types of dyestuffs, both chemically, such as, e.g. nitroso dyestuffs, nitro dyestuffs, azo dyestuffs, stilbene dyestuffs, carotenoid dyestuffs, diphenylmethane dyestuffs, triarylmethane dyestuffs, xanthene dyestuffs, acridine dyestuffs, quinoline dyestuffs, methine and polymethine dyestuffs, thiazole dyestuffs, indamine dyestuffs and indophenol dyestuffs, azine dyestuffs, oxazine dyestuffs, thiazine dyestuffs, sulphur dyestuffs, anthraquinone dyestuffs, indigoid dyestuffs, phthalocyanine dyestuffs and metal-complex dyestuffs, and colouristically, such as, e.g. acid dyestuffs, basic dyestuffs, developing dyestuffs (starting components), direct dyestuffs, disperse dyestuffs, foodstuff dyestuffs, reactive dyestuffs, vat dyestuffs and pigment dyestuffs.

With the appropriate modifications, the same applies for optical brighteners. Both ionic and nonionic optical brighteners are suitable.

The ionic optical brighteners can belong to the most varied chemical classes. By ionic optical brighteners are meant, for example, anionic brighteners such as substitution products of sulphonic acids and carboxylic acids, or cationic brighteners such as oxacyanines and quaternisation products. Those suitable, for example, are derivatives of the following types of compounds:

stilbene-4-naphthotriazole, 4,4'-diaminostilbene-2,2'-disulphonic acids (preferably bistriazinyl derivatives and bis-v-triazolyl derivatives); 1,4-distyrylbenzenes;

4,4'-distyrylbiphenyls; benzidines; benzimidazoles; 1,3,4-oxidazoles; diphenylimidazolones; 4- or 4,5-substituted 1,8-napthalimides; pyrazolines, particularly 1,3-diphenylpyrazoline; benzofurans; oxacyanines; pyrenes and 4-styryl-4'-(1,2,3-triazol-4-yl-ethylene)-biphenyls.

Nonionic brighteners belong, for example, to the class of coumarins (specially 3-phenyl-coumarins), 1,4-distyrylbenzenes, 4,4'-distyrylbiphenyls, benzoxazoles (specially benzoxazol-(2)-yl-stilbenes; benzoxazol-(2)-yl-styryls; bis-benzoxazol-(2)-yl derivatives of thiophene, of naphthalenes, of ethylene or of furan), benzimidazoles (specially benzimidazol-(2)-yl-stilbenes; bis-benzimidazol-(2)-yl derivatives of furan and of ethylene), 1,3,4-oxidiazoles, 4- or 4,5-substituted 1,8-naphthalimides, pyrazolines (specially 1,3-diphenylpyrazolines), benzofurans, pyrenes and 1,2,3-triazol-(2)-yl derivatives (inclusive of benzoand naphthotriazoles), e.g., of stilbene. All these substances can be conditioned, i.e. they can be free from diluting agents or they can contain diluting agents.

These new commercial preparations are prepared according to the invention by a process in which, e.g., powders of organic substances, such as dyestuffs or optical brighteners, are enclosed in this polyethylene oxide sheet as defined, or pastilles or granulates of such substances are coated with a sheet of that kind. Coating is effected by using, for example, solutions of polyethylene oxide. These solutions are applied to the substance-pastilles (capsules or granules) by one of the known processes, e.g. in a rotating coating tank using the fluidisation spraying technique, or by the dipping method.

The methods commonly applied in industry can be used for the preparation of small sacks or bags or larger packages, preferably packages of from 50 g to 5 kg. A polyethylene oxide sheet can thus be sealed hot. The forming of the packages can also be carried out in some other manner, and the contents of the package can be introduced by any desired means. Thus, for example, a flexible polyethylene oxide strip can be fed into a filling and packing machine and formed into a tube; this is filled with the substance to be packed and then formed into closed containers by compression transversely to its longitudinal direction. Another method of forming the packages is one whereby water is applied to the sheet by coating or in some other manner, immediately before forming the package, in such an amount that the sheet becomes sticky; the two layers of sheet are then sealed together, purely by pressure or by application of heat, whilst the sheet is still sticky.

The polyethylene oxide sheets suitable for the preparation of packages can be made from the numerous qualities available commercially.

The thickness of the sheets is, as mentioned, between 10 and 80μ. Thinner sheets do not have the necessary tensile strength to carry the weight of the contents of the package without tearing, while thicker sheets are uneconomical with respect to cost. Several filled single packages formed from sheet can be contained in a carton for storage or dispatch, and several cartons can be packed into a dispatch container which is normally made from cardboard or from some other stiff or rigid material, which provides additional protection. The individual packages may also be packed directly into a dispatch container.

With the new commercial preparations according to the invention it is possible, in the case of dyestuffs or optical brighteners as the contents, to dye or optically brighten the same materials as can be dyed or optically brightened with the said dyestuffs or optical brighteners in the unpacked form. The packages can be used directly for preparation of the required liquors, without prior removal of the covering material. They thus offer advantages, such as a saving of time and of skilled personnel, since no preliminary taring is necessary, but simply a counting of the packages which all contain the same amount of substance; moreover, the packages are more stable in storage than the powders which they contain, as the more compact mass of the packages means that smaller surface areas are exposed to harmful environmental effects, a factor which can be particularly important, for example, in the case of reactive dyestuffs or cationic dyestuffs. Finally, a very great advantage of the said packages is that they create no dust nuisance.

With the use of polyethylene oxide as the sheet material there is furthermore the advantage that the addition of polyethylene oxide to the dyeing bath, e.g. even in appreciable amounts, has practically no disadvantageous effect on the dyeing and on the fastness properties thereof.

The following examples illustrate the invention without limiting its scope. Temperatures are given in degrees Centigrade.

EXAMPLE 1

45 g of the dyestuff of the formula (commercial or pure form)

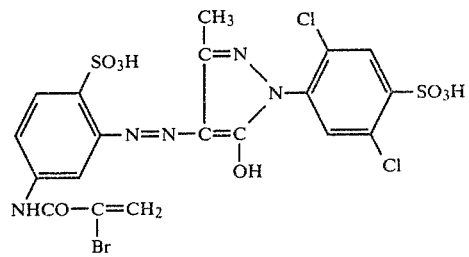

is acurately weighed into a polyethylene oxide bag (MW>200,000) having a thickness of 35μ, and the bag is sealed by melting. This bag serves as the commercial form or preparation of the dyestuff.

Wool fabric can be dyed with this polyethylene oxide bag; the said bag is dissolved in water at about 50°, and there are then introduced into the liquor, in addition to the mentioned wool fabric, the additives common in the dyeing industry, such as ammonium sulphate and Glauber's salt.

The temperature of the dye bath is then raised within 50 minutes to the boiling point, with an adjustment of the pH-value to 5 being carried out at 70° with acetic acid. The dyeing is terminated after 45 minutes boiling and the material is rinsed. The wool fabric is dried at 60° to 70° without centrifuging.

There is obtained a yellow-dyed wool fabric: the fastness to rubbing of the section of the fabric which was lying directly on the covering of the package is good to very good and the levelness is excellent.

If, instead of the dyestuff mentioned, identical amounts of the dyestuffs of the formulae (commercial or pure form)

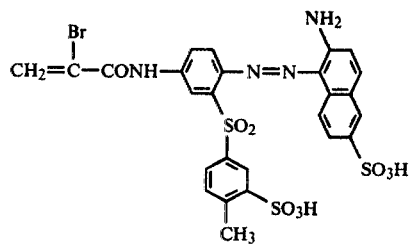

or

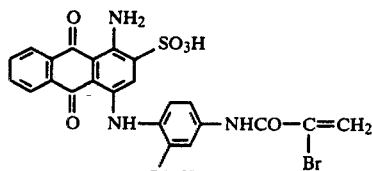

or

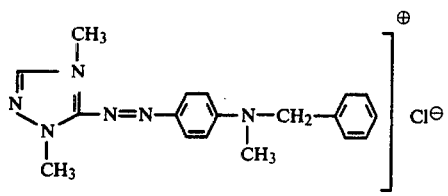

or optical brighteners of the formula

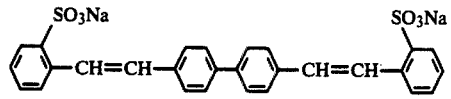

or

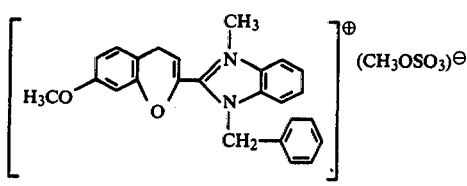

or

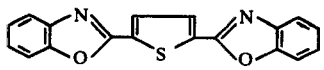

are weighed into the polyethylene oxide bag and the bag is then sealed by melting, then there is obtained for these dyestuffs or optical brighteners an equally good commercial preparation free from dust and directly ready for use.

EXAMPLE 8

45 g of the dyestuff of the formula

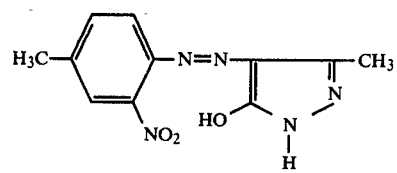

is weighed into a polyethylene oxide bag (MW>200,000) having a sheet thickness of 50μ, and the bag is sealed by melting.

A circulation apparatus is charged with 6 kg of polyester textured yarn in the form of wound packages. 60 liters of tetrachloroethylene are heated in the preparing vessel to 70° to 80° and the polyethylene oxide bag is introduced. The bag dissolves in a few seconds and releases the dyestuff. The liquor thus obtained is pumped into the apparatus. The temperature is raised within 5 minutes to 120°, and dyeing is performed for 30 minutes with continuous circulation of the bath. The bath is subsequently cooled to 110° and the material is removed; it is rinsed twice with pure tetrachloroethylene for 5 minutes and then dried. There is obtained a yellow-dyed wound package having excellent levelness and fastness to rubbing.

What is claimed is:

1. Stable dust-free commercial preparations of organic substances, which preparations comprise an organic dyestuff, optical brightener or dyeing auxiliary substance in dry powder form enclosed in a covering having a thickness of 10 to 80μ, said covering forming a sack or bag sealed on all sides, made from polyethylene oxide having a molecular weight of more than 200,000.

2. Commercial preparation according to claim 1 having a polyethylene oxide covering made from a polymerisation product of ethylene oxide having a molecular weight of more than 200,000, which covering has a thickness of 50μ.

3. Commercial preparation according to claim 1 having a content of water-soluble reactive dyestuffs or cation-active dyestuffs.

4. Commercial preparation according to claim 1 having a content of organic dyestuffs soluble in organic solvents or of optical brighteners soluble in organic solvents.

5. Polyethylene oxide packages having a molecular weight of more than 200,000 and a sheet thickness of 10 to 80μ which contain a pulverulent organic substance soluble in water or in organic solvents.

6. Process for the manufacture of commercial preparations according to claim 1, wherein pulverulent organic substances soluble in water or in organic solvents are enclosed in a polyethylene oxide covering made from a polymerisation product of ethylene oxide having a molecular weight of more than 200,000, which covering has a thickness of 10 to 80μ.

* * * * *